D. C. AYRES.
Harrow.
No. 21,403.  Patented Sept. 7, 1858.
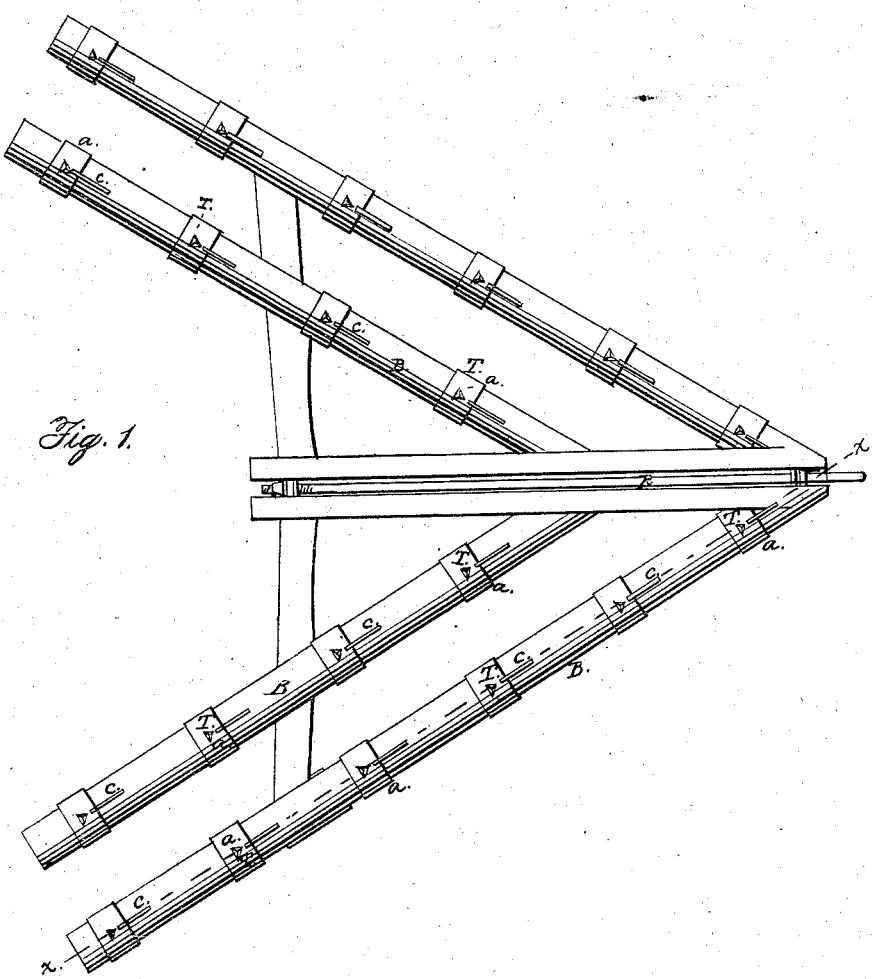
Fig. 1.
Fig. 2.
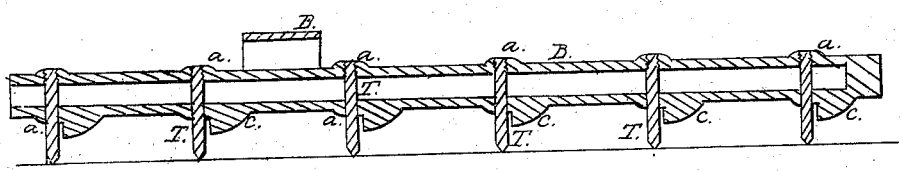

UNITED STATES PATENT OFFICE.

DAVID C. AYRES, OF LUMBERLAND, NEW YORK.

IMPROVEMENT IN HARROWS.

Specification forming part of Letters Patent No. 21,403, dated September 7, 1858.

*To all whom it may concern:*

Be it known that I, DAVID C. AYRES, of Lumberland, in the county of Sullivan and State of New York, have invented a new and useful Improvement in Harrows; and I do hereby declare that the following is a full, clear, and exact description of the same, reference being had to the annexed drawings, forming part of this specification, in the several figures of which similar characters of reference denote the same parts.

Figure 1 is a plan view of the harrow. Fig. 2 is a section on line $x\ x$.

The nature of my invention consists in a peculiar manner of constructing harrows, as hereinafter to be set forth.

The harrow is triangular, of two parts, hinged by draft-rod R, as shown in Fig. 1. The longitudinal pieces B, to which the teeth are attached, are tubular, with exterior globular projections, $a\ a$, at the points of insertion of the teeth. These projections serve to give strength at these points, and also perform another function, which will be hereinafter specified.

In front of the teeth, and cast with pieces B, are cutters $c$, which act with the projections $a$ in the operation of the implement.

The teeth T are of ordinary form, and are secured by screwing into piece B, as shown in Fig. 2.

Upon one piece B is a rest, D, to receive the opposite portion of the harrow when resolved about bolt R.

The operation of this harrow is as follows: The cutters $c$ serve the function of cutting sods and preventing trash from collecting on the teeth, while the globular projections $a\ a$ at the base of the cutters crush the clods severed by the knives, and act in conjunction therewith as pulverizers. These projections also serve the function of preventing the frame from dragging upon the ground when the teeth have sunk into the soil their full length.

I am aware of the use of tubular frame-work, and therefore do not claim it; but

What I do claim is—

The combination of tubular piece B, globular projections $a$, cutters $c$, and teeth T, constructed, arranged, and operating together as described.

In testimony whereof I have hereunto signed my name before two subscribing witnesses.

DAVID C. AYRES.

Witnesses:
 JAS. D. CLARY,
 W. S. CLARY.